(12) United States Patent
Wu

(10) Patent No.: US 7,530,172 B1
(45) Date of Patent: May 12, 2009

(54) LABOR-SAVING LONG-ARM GARDENING SHEARS

(75) Inventor: Shih-Piao Wu, Changhua Hsien (TW)

(73) Assignee: Jiin Haur Industrial Co., Ltd., Changhua Hsien (TW)

( * ) Notice: Subject to any disclaimer, the term of this patent is extended or adjusted under 35 U.S.C. 154(b) by 0 days.

(21) Appl. No.: 11/755,123

(22) Filed: May 30, 2007

(51) Int. Cl.
*B26B 13/26* (2006.01)
(52) U.S. Cl. ............... 30/244; 30/245; 30/250; 30/251; 30/252
(58) Field of Classification Search .......... 30/249, 30/250, 245, 251, 244, 252–254, 248, 272.1, 30/186–193; 81/342, 358, 128
See application file for complete search history.

(56) References Cited

U.S. PATENT DOCUMENTS

| 1,569,581 A * | 1/1926 | Scott ................... 81/356 |
| 2,592,098 A * | 4/1952 | Zimdars .................. 81/309 |
| 4,254,549 A * | 3/1981 | McMullin ................. 30/251 |
| 5,715,604 A * | 2/1998 | Lanzoni .................. 30/192 |
| 6,105,257 A * | 8/2000 | Rutkowski et al. ........... 30/199 |
| 6,901,665 B2 * | 6/2005 | Sun et al. ................ 30/249 |
| 6,938,346 B1 * | 9/2005 | Huang .................... 30/250 |
| 2004/0045175 A1 * | 3/2004 | Jang .................... 30/249 |

* cited by examiner

*Primary Examiner*—Boyer D Ashley
*Assistant Examiner*—Omar Flores-Sánchez
(74) *Attorney, Agent, or Firm*—Alan Kamrath; Kamrath & Associates PA

(57) ABSTRACT

A pair of long-arm gardening shears include a hollow mounting seat, an extension tube, a cutting tool, a link, a toothed rack, two spaced driven gears, and two elongated handles. Each of the elongated handles is provided with a toothed drive portion meshing with a respective driven gear to rotate the respective driven gear. Thus, the cutting tool is driven by a leverage action of the handles and by a gearing action of the toothed drive portions of the handles, the driven gears and the toothed rack, so that the long-arm gardening shears can perform a cutting action in a labor-saving manner, thereby greatly saving the user's energy.

16 Claims, 5 Drawing Sheets

LABOR-SAVING LONG-ARM GARDENING SHEARS

BACKGROUND OF THE INVENTION

1. Field of the Invention

The present invention relates to a cutting tool for gardening use and, more particularly, to a pair of long-arm gardening shears.

2. Description of the Related Art

A pair of conventional long-arm gardening shears comprise two elongated handles pivotally connected with each other. Each of the elongated handles has a shorter front end provided with a cutting blade and a longer rear end provided with a holding portion. Thus, when the elongated handles are pivoted relative to each other, the cutting blades are movable relative to each other so as to perform a cutting action. However, the conventional long-arm gardening shears do not have a labor-saving function, thereby greatly causing inconvenience to a user when cutting branches having a larger size.

BRIEF SUMMARY OF THE INVENTION

In accordance with the present invention, there is provided a pair of long-arm gardening shears, comprising a hollow mounting seat, an extension tube having a first end mounted on a first end of the mounting seat, a cutting tool mounted on the extension tube and including a fixed blade secured on a second end of the extension tube and a movable blade pivotally connected with the fixed blade, a link movably mounted in the extension tube and having a first end connected with the movable blade of the cutting tool to drive the movable blade of the cutting tool to pivot relative to the fixed blade, a toothed rack movably mounted in the mounting seat and connected with a second end of the link so that the link is movable axially in concert with the toothed rack, two spaced driven gears rotatably mounted in the mounting seat and meshing with the toothed rack to move the toothed rack, and two elongated handles each pivotally mounted on a second end of the mounting seat and each having a first end provided with a substantially arc-shaped toothed drive portion meshing with a respective driven gear to rotate the respective driven gear.

The primary objective of the present invention is to provide a pair of long-arm gardening shears having a labor-saving function.

Another objective of the present invention is to provide a pair of long-arm gardening shears, wherein the cutting tool is driven by a leverage action of the handles and by a gearing action of the toothed drive portions of the handles, the driven gears and the toothed rack, so that the long-arm gardening shears can perform a cutting action in a labor-saving manner, thereby greatly saving the user's energy.

A further objective of the present invention is to provide a pair of long-arm gardening shears, wherein the cutting tool is rotatable relative to the mounting seat and the handles to adjust an angle between the cutting tool and the handles, thereby facilitating the user operating the handles and the cutting tool to perform the cutting action.

Further benefits and advantages of the present invention will become apparent after a careful reading of the detailed description with appropriate reference to the accompanying drawings.

BRIEF DESCRIPTION OF THE SEVERAL VIEWS OF THE DRAWING(S)

DETAILED DESCRIPTION OF THE INVENTION

Figure 1:
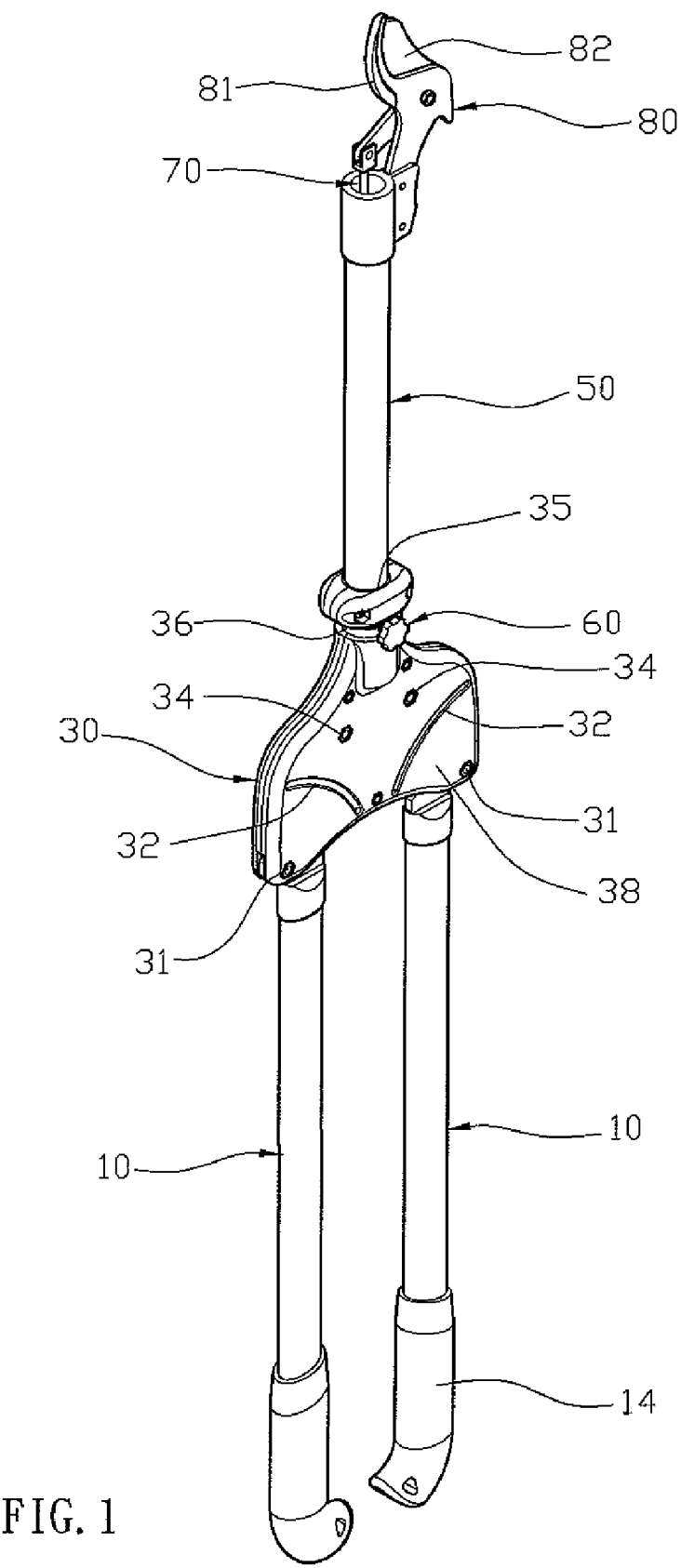
FIG. 1 is a perspective view of a pair of long-arm gardening shears in accordance with the preferred embodiment of the present invention.
Figure 2:
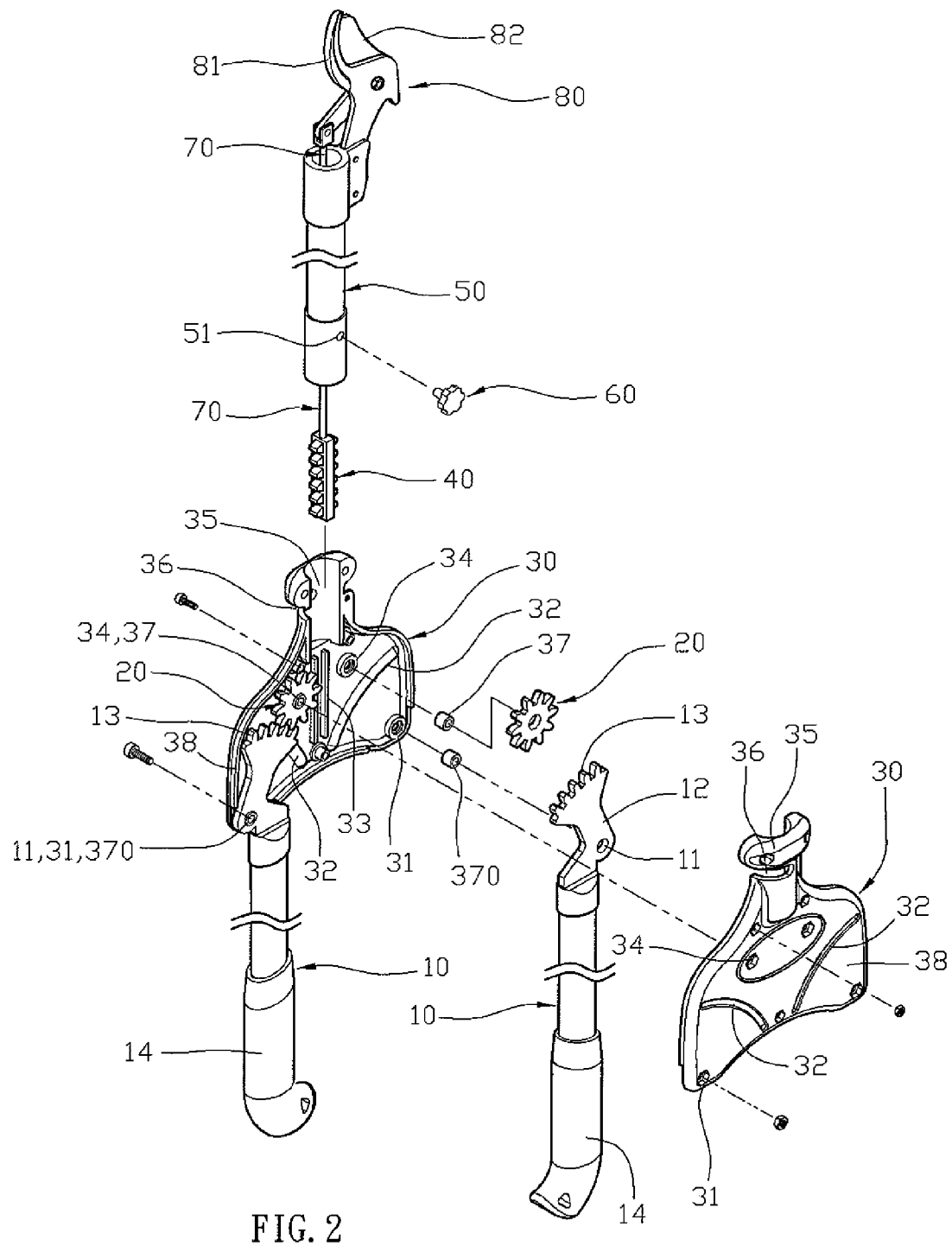
FIG. 2 is an exploded perspective view of the gardening shears as shown in FIG. 1.
Figure 3:
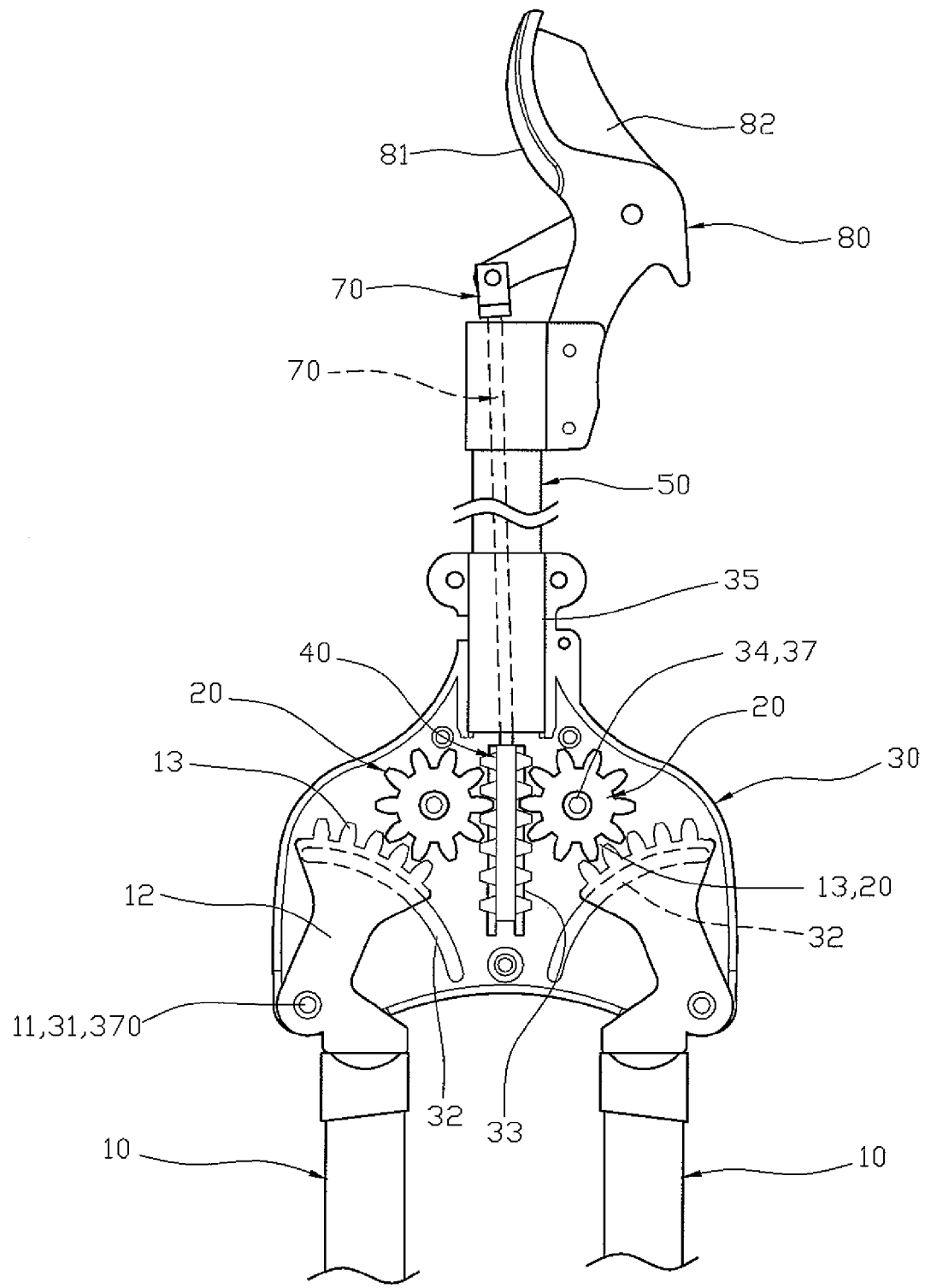
FIG. 3 is a front broken view of the gardening shears as shown in FIG. 1.

Referring to the drawings and initially to FIGS. 1-3, a pair of long-arm gardening shears in accordance with the preferred embodiment of the present invention comprise a hollow mounting seat 30, an extension tube 50 having a first end mounted on a first end of the mounting seat 30, a cutting tool 80 mounted on the extension tube 50 and including a fixed blade 81 secured on a second end of the extension tube 50 and a movable blade 82 pivotally connected with the fixed blade 81, a link 70 movably mounted in the extension tube 50 and having a first end connected with the movable blade 82 of the cutting tool 80 to drive the movable blade 82 of the cutting tool 80 to pivot relative to the fixed blade 81, a toothed rack 40 movably mounted in the mounting seat 30 and connected with a second end of the link 70 so that the link 70 is movable axially in concert with the toothed rack 40, two spaced driven gears 20 rotatably mounted in the mounting seat 30 and meshing with the toothed rack 40 to move the toothed rack 40, and two elongated handles 10 each pivotally mounted on a second end of the mounting seat 30 and each having a first end provided with a substantially arc-shaped toothed drive portion 13 meshing with a respective driven gear 20 to rotate the respective driven gear 20.

The mounting seat 30 consists of two opposite shells 38 combined together. The first end of the mounting seat 30 is provided with a protruding mounting portion 35 for mounting the first end of the extension tube 50. The mounting portion 35 of the mounting seat 30 has a periphery formed with an elongated adjusting slot 36. The mounting seat 30 is provided with two pivot portions 34 for pivotally mounting the driven gears 20 by two bushings 37 and an axially extending elongated guide portion 33 located between the pivot portions 34 to guide movement of the toothed rack 40 in the mounting seat 30. The second end of the mounting seat 30 is provided with two pivot sections 31 and two substantially arc-shaped protruding pressing ribs 32 each centered at a respective pivot section 31.

Each of the handles 10 has a second end protruded outwardly from the mounting seat 30 and provided with a holding portion 14. The first end of each of the handles 10 is hidden in the mounting seat 30 and provided with a bent arm 12 having a first portion formed with a pivot hole 11 pivotally mounted on a respective pivot section 31 of the mounting seat 30 by a bushing 370 and a second portion formed with the toothed drive portion 13. The distance between the toothed drive portion 13 and the pivot hole 11 of each of the handles 10 is smaller than that between the holding portion 14 and the pivot hole 11 of each of the handles 10. Each of the pressing ribs 32 of the mounting seat 30 presses the bent arm 12 of a respective handle 10 and is located between the toothed drive portion 13 and the pivot hole 11 of the respective handle 10.

The toothed rack 40 is located between the driven gears 20 and is movable axially in the mounting seat 30.

The first end of the extension tube 50 is rotatably mounted in the mounting portion 35 of the mounting seat 30 and has a periphery formed with a screw bore 51 aligning with the adjusting slot 36 of the mounting portion 35 of the mounting seat 30, and a threaded knob 60 is slidably mounted in the adjusting slot 36 of the mounting portion 35 of the mounting seat 30 and screwed into the screw bore 51 of the extension tube 50 so that the threaded knob 60 is slidable in the adjusting slot 36 of the mounting portion 35 of the mounting seat 30 to rotate the extension tube 50 relative to the mounting seat 30.

The first end of the link 70 protrudes outwardly from the extension tube 50 and is pivotally connected with the movable blade 82 of the cutting tool 80, and the second end of the link 70 is extended into the mounting seat 30 and is rotatably mounted on the toothed rack 40. Thus, when the extension tube 50 is rotatable relative to the mounting seat 30, the cutting tool 80 is rotatable with the extension tube 50, and the link 70 is rotatable with the cutting tool 80 and is rotatable relative to the toothed rack 40.

Figure 4:
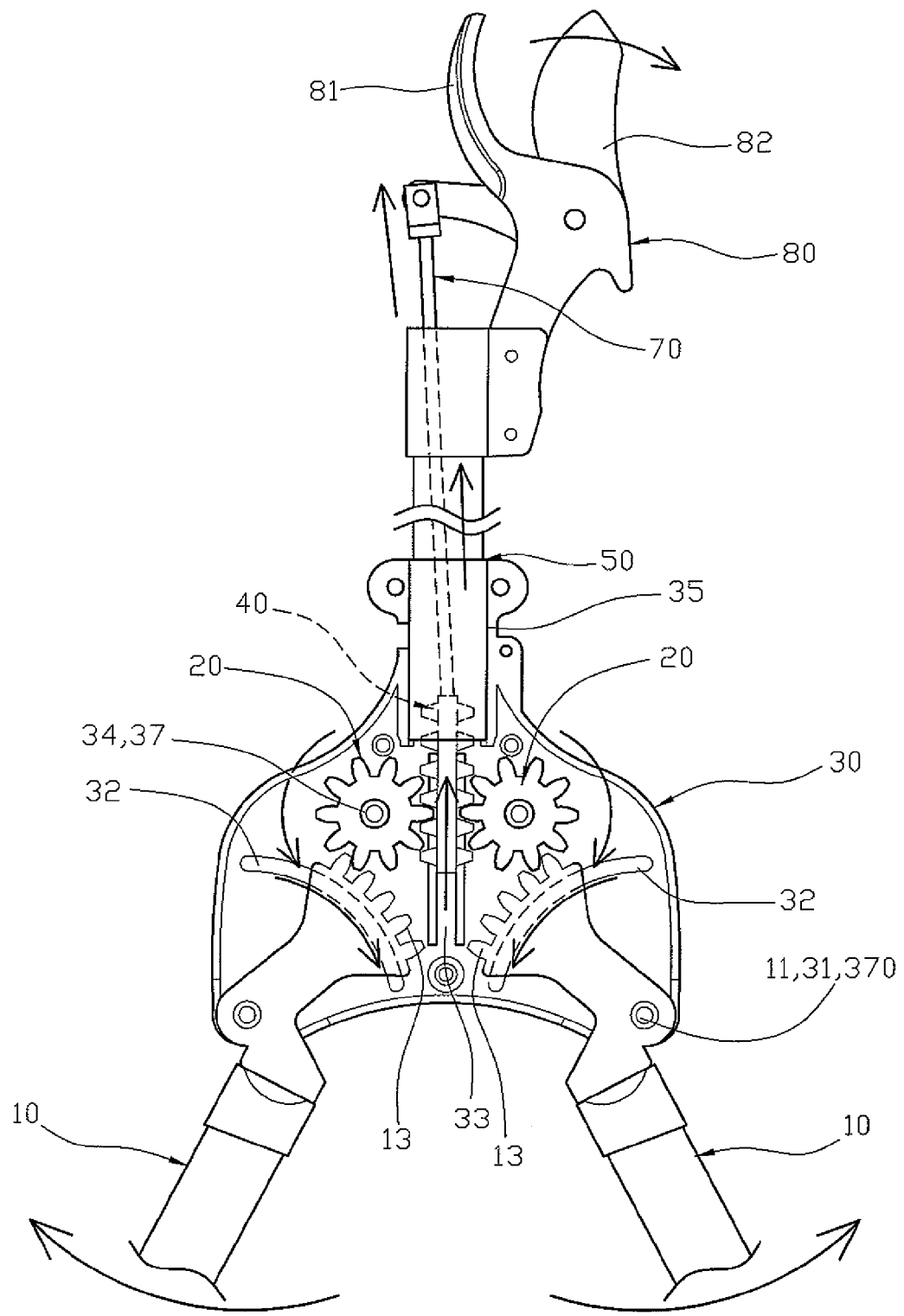
FIG. 4 is a schematic operational view of the gardening shears as shown in FIG. 3.

In operation, referring to FIGS. 3 and 4 with reference to FIGS. 1 and 2, when the handles 10 are movable relative to each other, the toothed drive portion 13 of each of the handles 10 is movable to rotate the respective driven gear 20 which moves the toothed rack 40 which moves the link 70 which moves the movable blade 82 of the cutting tool 80 to drive the movable blade 82 of the cutting tool 80 to pivot relative to the fixed blade 81. Thus, the movable blade 82 of the cutting tool 80 is movable relative to the fixed blade 81 successively as shown in FIGS. 3 and 4 to perform a cutting action.

Figure 5:
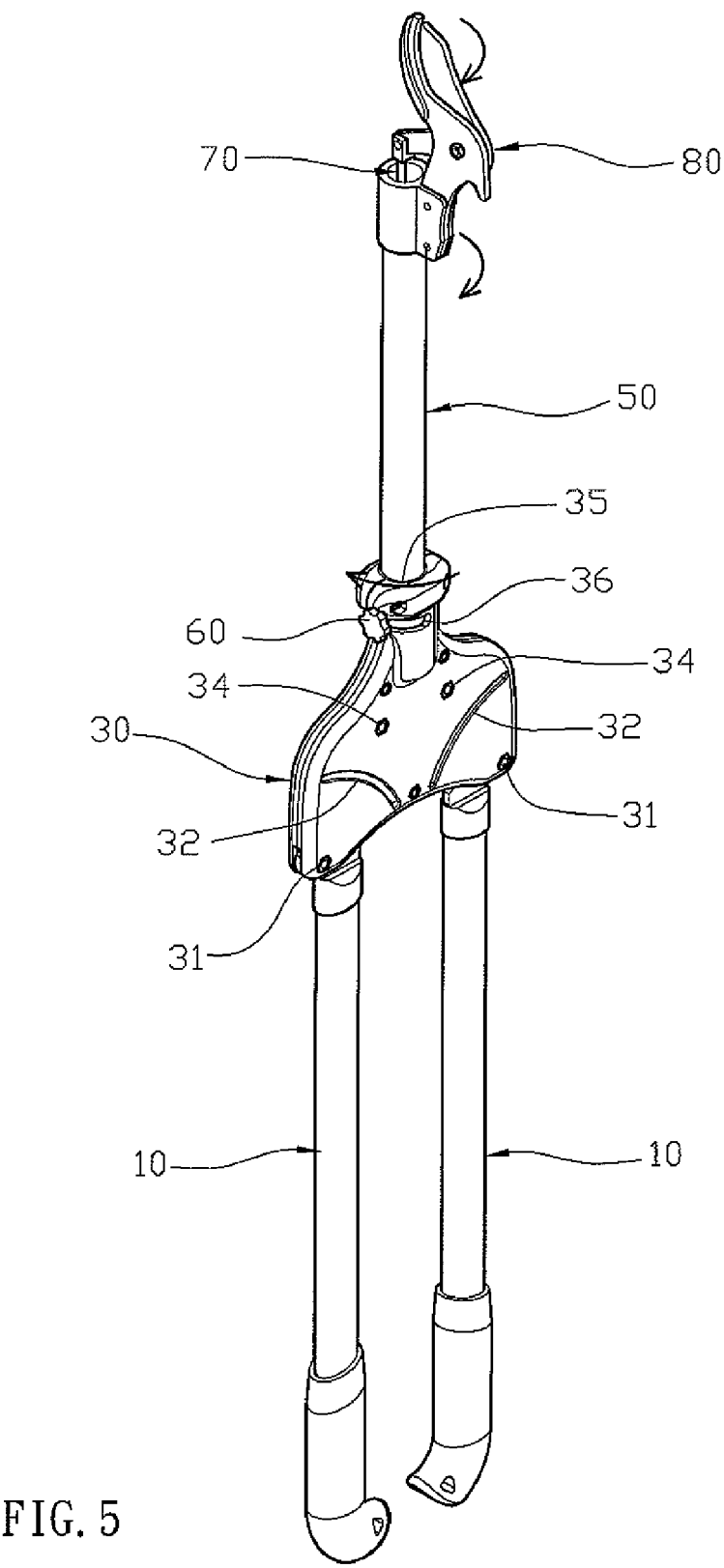
FIG. 5 is a schematic operational view of the gardening shears as shown in FIG. 1.

In adjustment, referring to FIG. 5 with reference to FIGS. 1 and 2, after the threaded knob 60 is unscrewed from the screw bore 51 of the extension tube 50, the extension tube 50 is released from the threaded knob 60 so that the extension tube 50 is rotatable relative to the mounting seat 30. Thus, when the extension tube 50 is rotatable relative to the mounting seat 30, the cutting tool 80 is rotatable with the extension tube 50 and is rotatable relative to the mounting seat 30 and the handles 10 so as to adjust an angle between the cutting tool 80 and the handles 10, thereby facilitating a user operating the handles 10 and the cutting tool 80 to perform a cutting action. At this time, the link 70 is rotatable with the cutting tool 80 and is rotatable relative to the toothed rack 40 so that operation of the toothed rack 40 will not be affected by rotation of the extension tube 50.

Accordingly, the cutting tool 80 is driven by a leverage action of the handles 10 and by a gearing action of the toothed drive portions 13 of the handles 10, the driven gears 20 and the toothed rack 40, so that the long-arm gardening shears can perform a cutting action in a labor-saving manner, thereby greatly saving the user's energy. In addition, the cutting tool 80 is rotatable relative to the mounting seat 30 and the handles 10 to adjust an angle between the cutting tool 80 and the handles 10, thereby facilitating the user operating the handles 10 and the cutting tool 80 to perform the cutting action.

Although the invention has been explained in relation to its preferred embodiment(s) as mentioned above, it is to be understood that many other possible modifications and variations can be made without departing from the scope of the present invention. It is, therefore, contemplated that the appended claim or claims will cover such modifications and variations that fall within the true scope of the invention.

The invention claimed is:

1. A pair of long-arm gardening shears, comprising:
   a hollow mounting seat;
   an extension tube having a first end mounted on a first end of the mounting seat;
   a cutting tool mounted on the extension tube and including a fixed blade secured on a second end of the extension tube and a movable blade pivotally connected with the fixed blade;
   a link movably mounted in the extension tube and having a first end connected with the movable blade of the cutting tool to drive the movable blade of the cutting tool to pivot relative to the fixed blade;
   a toothed rack movably mounted in the mounting seat and connected with a second end of the link so that the link is movable axially in concert with the toothed rack;
   two spaced driven gears rotatably mounted in the mounting seat and meshing with the toothed rack to move the toothed rack;
   two elongated handles each pivotally mounted on a second end of the mounting seat and each having a first end provided with a substantially arc-shaped toothed drive portion meshing with a respective driven gear to rotate the respective driven gear; wherein
   the mounting seat is provided with two pivot portions for pivotally mounting the driven gears by two bushings;
   the mounting seat is provided with an axially extending elongated guide portion to guide movement of the toothed rack in the mounting seat.

2. The gardening shears in accordance with claim 1, wherein the guide portion of the mounting seat is located between the pivot portions.

3. A pair of long-arm gardening shears, comprising:
   a hollow mounting seat;
   an extension tube having a first end mounted on a first end of the mounting seat;
   a cutting tool mounted on the extension tube and including a fixed blade secured on a second end of the extension tube and a movable blade pivotally connected with the fixed blade;
   a link movably mounted in the extension tube and having a first end connected with the movable blade of the cutting tool to drive the movable blade of the cutting tool to pivot relative to the fixed blade;
   a toothed rack movably mounted in the mounting seat and connected with a second end of the link so that the link is movable axially in concert with the toothed rack;
   two spaced driven gears rotatably mounted in the mounting seat and meshing with the toothed rack to move the toothed rack;
   two elongated handles each pivotally mounted on a second end of the mounting seat and each having a first end provided with a substantially arc-shaped toothed drive portion meshing with a respective driven gear to rotate the respective driven gear; wherein
   the second end of the mounting seat is provided with two pivot sections;
   the first end of each of the handles is provided with a bent arm having a first portion formed with a pivot hole pivotally mounted on a respective pivot section of the mounting seat by a bushing and a second portion formed with the toothed drive portion;
   the second end of the mounting seat is provided with two substantially arc-shaped protruding pressing ribs each pressing the bent arm of a respective handle.

4. The gardening shears in accordance with claim 3, wherein each of the pressing ribs of the mounting seat is located between the toothed drive portion and the pivot hole of the respective handle.

5. The gardening shears in accordance with claim 3, wherein each of the pressing ribs of the mounting seat is centered at a respective pivot section.

6. The gardening shears in accordance with claim 3, wherein each of the handles has a second end protruded outwardly from the mounting seat and provided with a grip portion.

7. The gardening shears in accordance with claim 6, wherein a distance between the toothed drive portion and the pivot hole of each of the handles is smaller than that between the grip portion and the pivot hole of each of the handles.

8. A pair of long-arm gardening shears, comprising:
a hollow mounting seat;
an extension tube having a first end mounted on a first end of the mounting seat;
a cutting tool mounted on the extension tube and including a fixed blade secured on a second end of the extension tube and a movable blade pivotally connected with the fixed blade;
a link movably mounted in the extension tube and having a first end connected with the movable blade of the cutting tool to drive the movable blade of the cutting tool to pivot relative to the fixed blade;
a toothed rack movably mounted in the mounting seat and connected with a second end of the link so that the link is movable axially in concert with the toothed rack;
two spaced driven gears rotatably mounted in the mounting seat and meshing with the toothed rack to move the toothed rack;
two elongated handles each pivotally mounted on a second end of the mounting seat and each having a first end provided with a substantially arc-shaped toothed drive portion meshing with a respective driven gear to rotate the respective driven gear; wherein
the first end of the mounting seat is provided with a protruding mounting portion for mounting the first end of the extension tube,
the mounting portion of the mounting seat has a periphery formed with an elongated adjusting slot;
the first end of the extension tube has a periphery formed with a screw bore aligning with the adjusting slot of the mounting portion of the mounting seat;
the gardening shears further comprise a threaded knob slidably mounted in the adjusting slot of the mounting portion of the mounting seat and screwed into the screw bore of the extension tube.

9. The gardening shears in accordance with claim 8, wherein the first end of each of the handles is hidden in the mounting seat.

10. The gardening shears in accordance with claim 8, wherein the toothed rack is located between the driven gears and is movable axially in the mounting seat.

11. The gardening shears in accordance with claim 8, wherein:
the first end of the extension tube is rotatably mounted in the mounting portion of the mounting seat;
the second end of the link is rotatably mounted on the toothed rack.

12. The gardening shears in accordance with claim 11, wherein when the extension tube is rotatable relative to the mounting seat, the cutting tool is rotatable with the extension tube, and the link is rotatable with the cutting tool and is rotatable relative to the toothed rack.

13. The gardening shears in accordance with claim 8, wherein the cutting tool is driven by a leverage action of the handles and by a gearing action of the toothed drive portions of the handles, the driven gears and the toothed rack.

14. The gardening shears in accordance with claim 8, wherein:
the first end of the link protrudes outwardly from the extension tube;
the second end of the link is extended into the mounting seat.

15. The gardening shears in accordance with claim 8, wherein the first end of the link is pivotally connected with the movable blade of the cutting tool.

16. The gardening shears in accordance with claim 8, wherein the threaded knob is slidable in the adjusting slot of the mounting portion of the mounting seat to rotate the extension tube relative to the mounting seat.

* * * * *